Jan. 7, 1958 A. H. GALLEY 2,818,580
SINK BOWL STRUCTURE
Filed Feb. 7, 1956 7 Sheets-Sheet 1
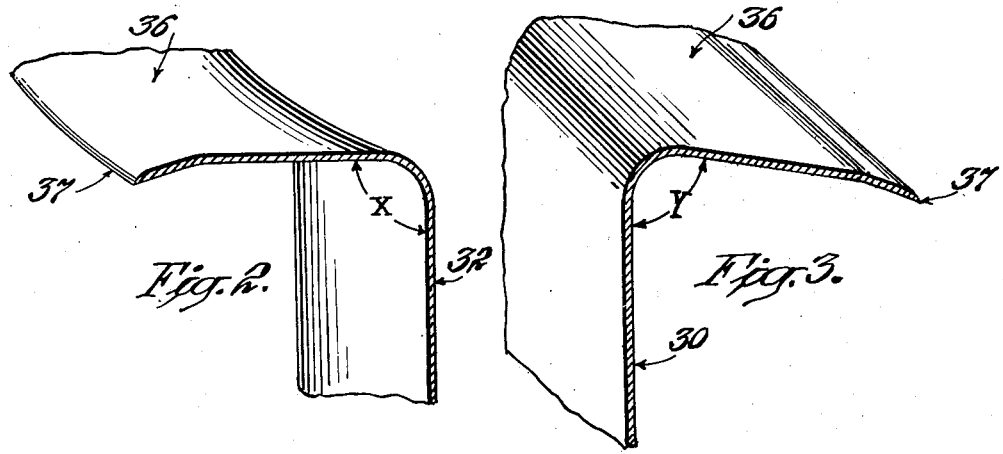
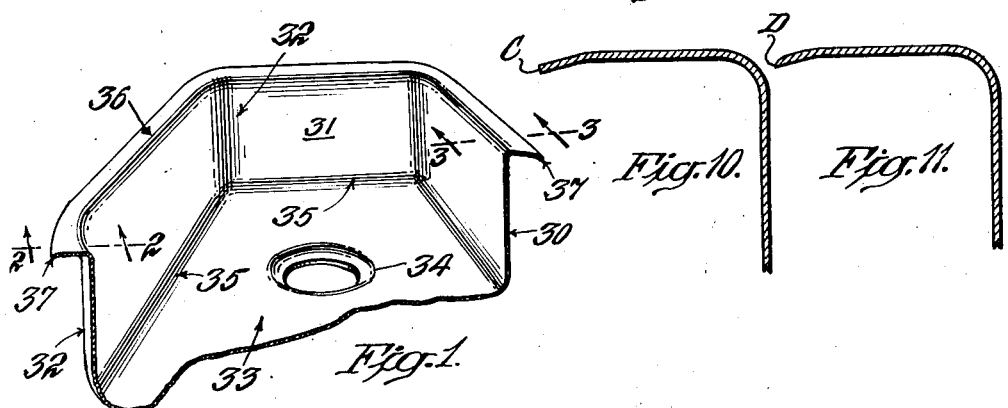
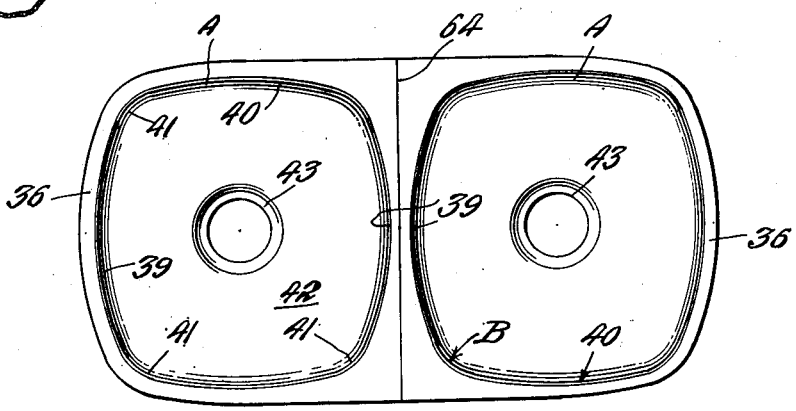
INVENTOR.
ANDREW HARRY GALLEY
BY
ATTORNEY

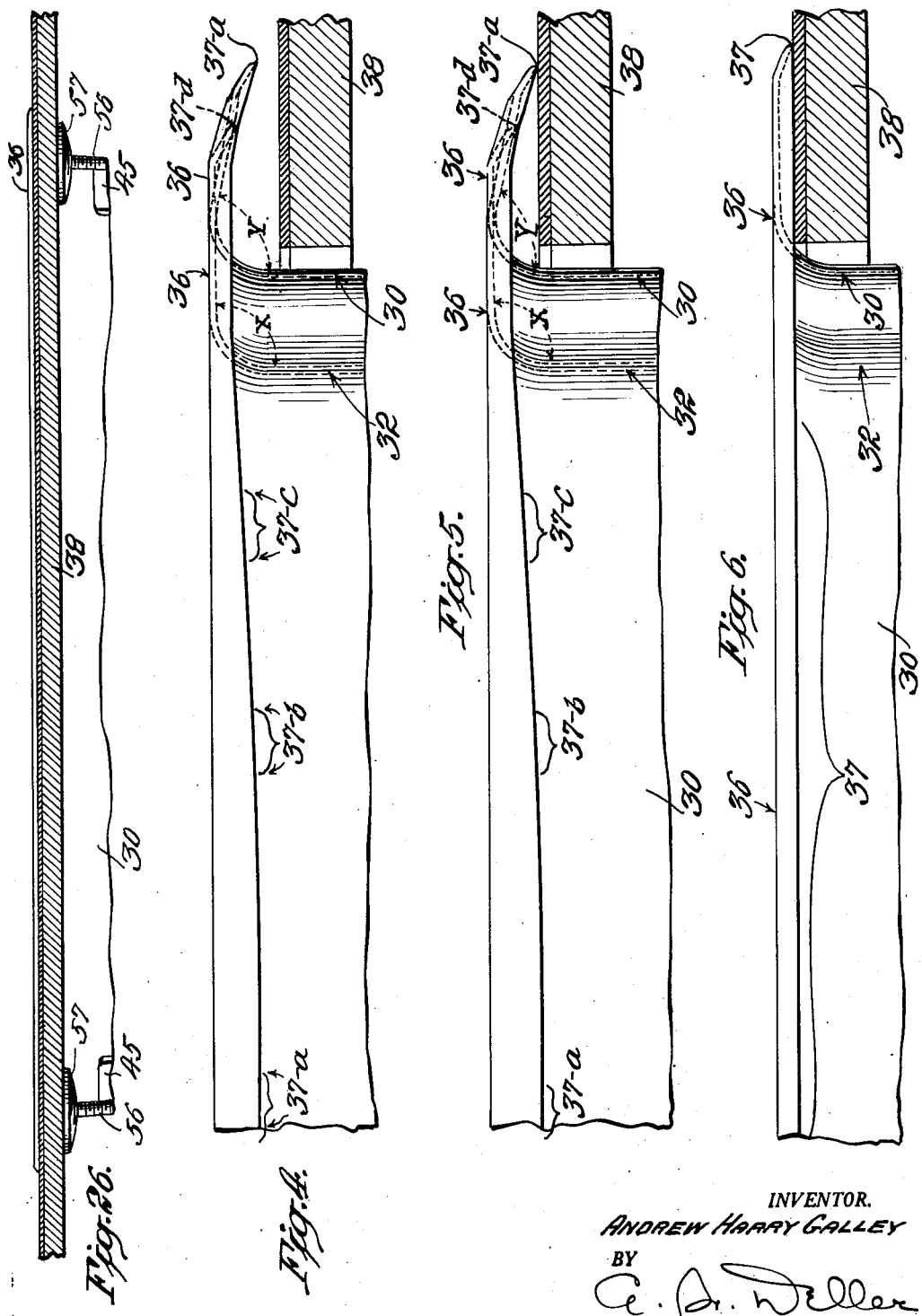

Jan. 7, 1958
A. H. GALLEY
2,818,580
SINK BOWL STRUCTURE
Filed Feb. 7, 1956
7 Sheets-Sheet 4
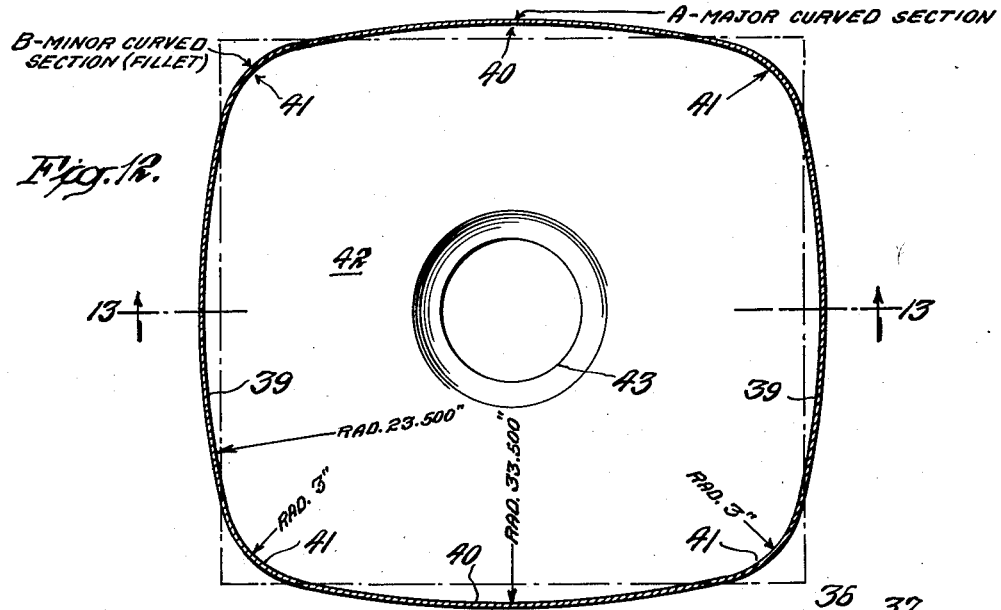
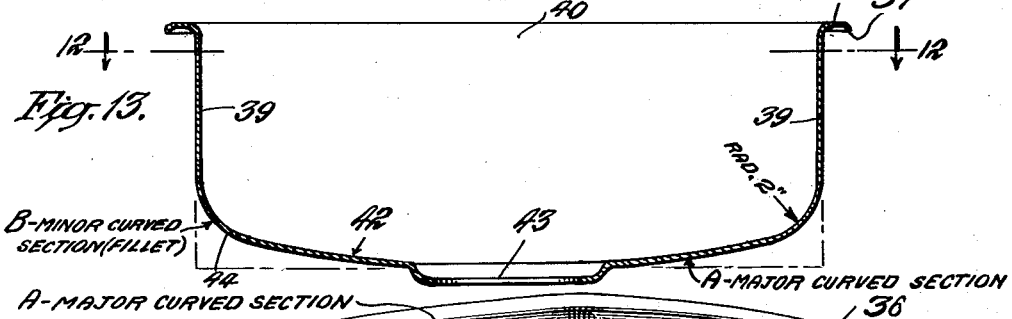
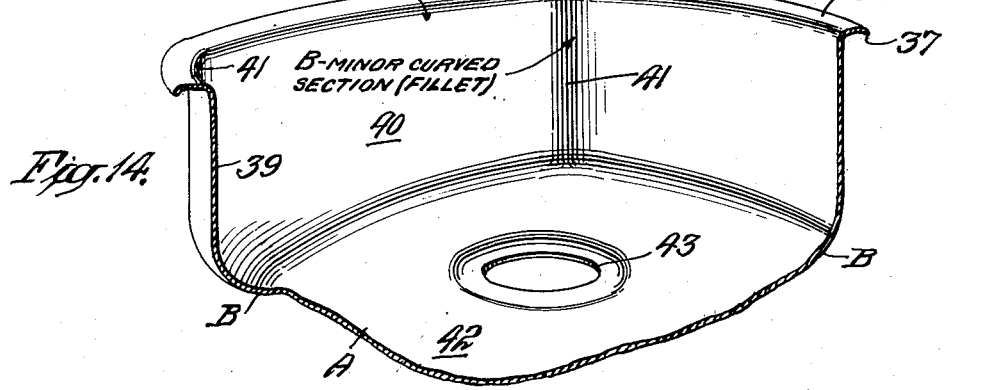
INVENTOR.
ANDREW HARRY GALLEY
BY
ATTORNEY

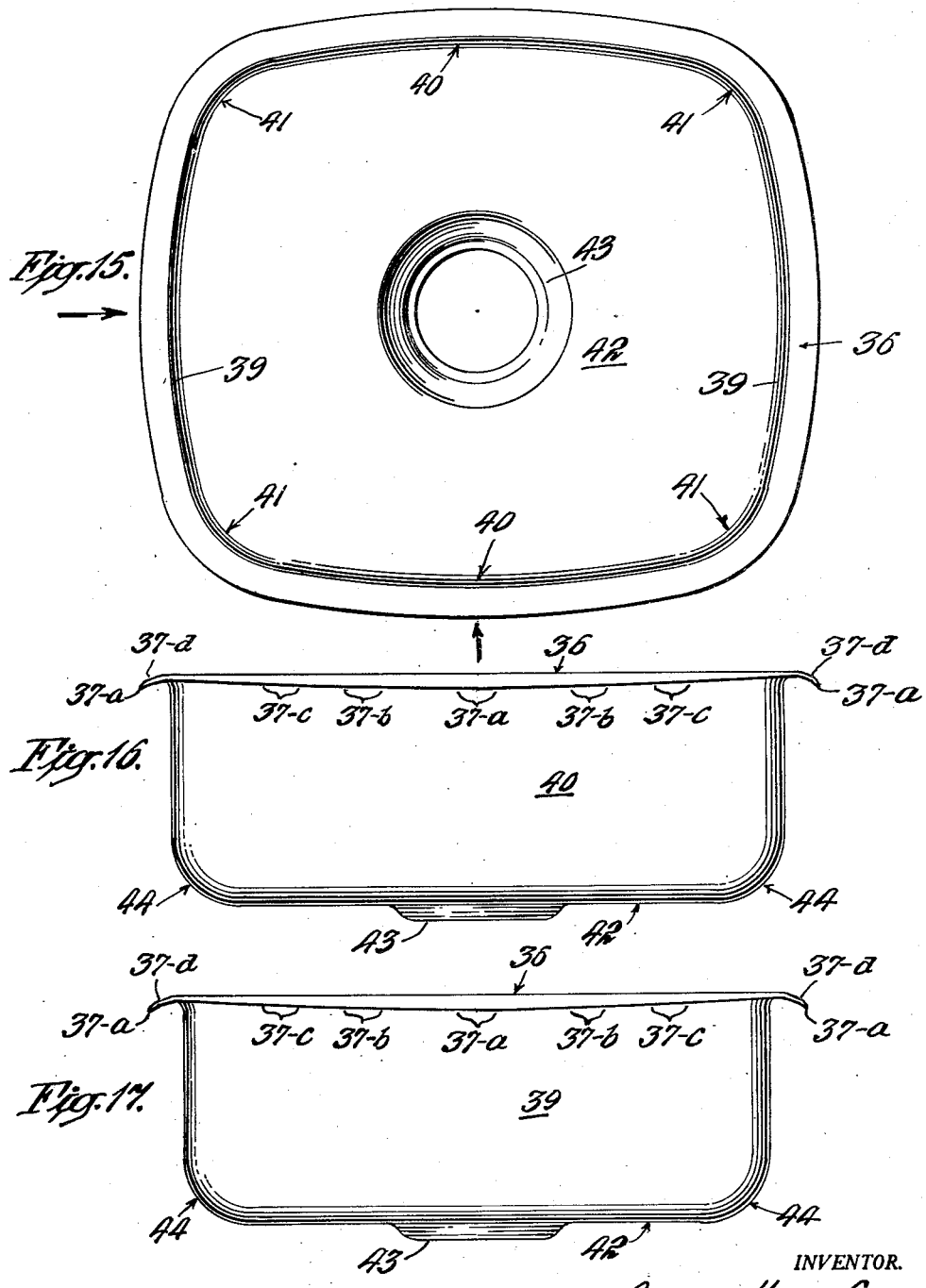

Jan. 7, 1958  A. H. GALLEY  2,818,580
SINK BOWL STRUCTURE
Filed Feb. 7, 1956  7 Sheets-Sheet 6
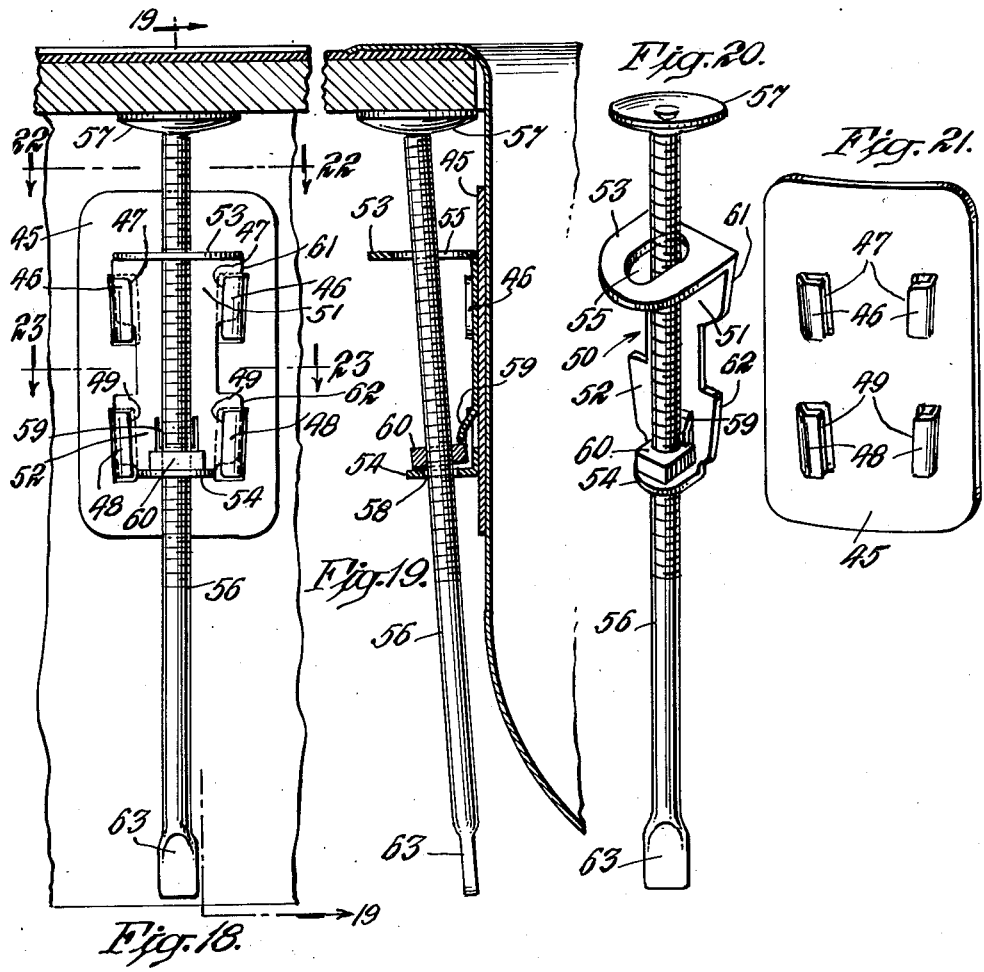
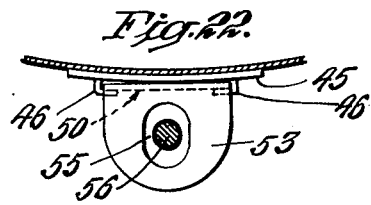
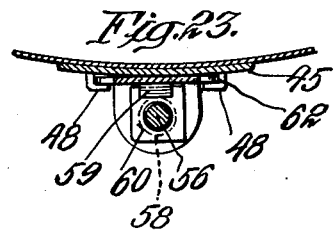
INVENTOR.
ANDREW HARRY GALLEY
BY
ATTORNEY Jan. 7, 1958     A. H. GALLEY     2,818,580
SINK BOWL STRUCTURE
Filed Feb. 7, 1956     7 Sheets-Sheet 7
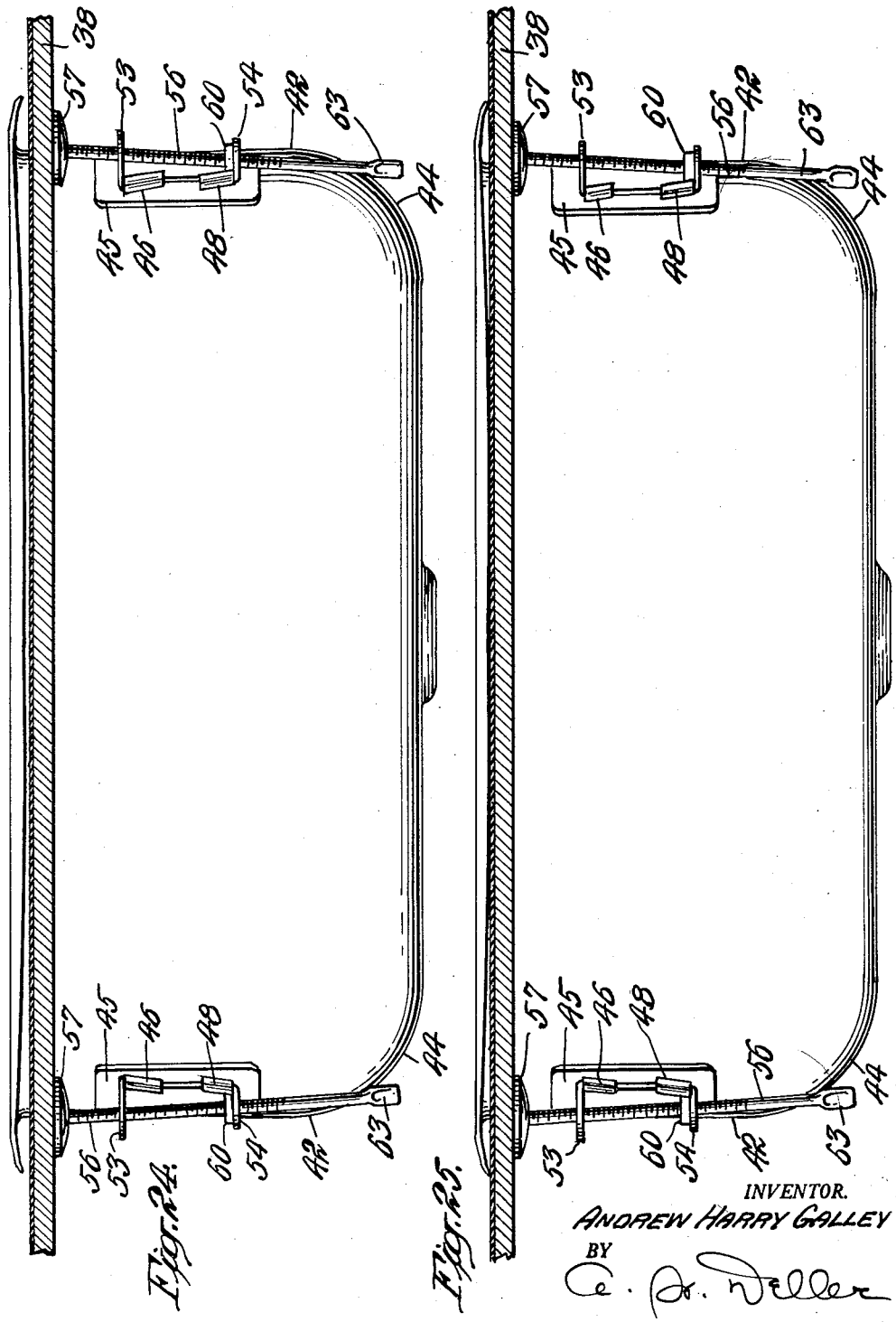
INVENTOR.
ANDREW HARRY GALLEY
BY
ATTORNEY

United States Patent Office 2,818,580
Patented Jan. 7, 1958

2,818,580

SINK BOWL STRUCTURE

Andrew Harry Galley, Toronto, Ontario, Canada, assignor to John V. Galley, White Plains, N. Y.

Application February 7, 1956, Serial No. 563,987

10 Claims. (Cl. 4—187)

The present invention relates to an improved sink bowl structure and, more particularly, to a corrosion-resistant unitary metallic sink bowl unit in the wrought form, characterized by a resilient flange of novel configuration adapted to provide a resilient and self-sealing engagement with a surface of a sink deck and to means for facilitating the installation of sink bowl structures in sink deck openings.

Heretofore, endeavors have been made to provide metallic sink bowl structures which exhibited not only a sanitary and attractive appearance but which were capable of being economically produced, and which could be easily installed even by the unskilled layman. Incident to the manufacture thereof, considerable difficulty has been experienced in effectively and economically achieving a permanent and satisfactory water-tight sealing engagement between the sink bowl and the sink deck or drainboard.

It is common in prior art practice to provide metallic sink bowl structures characterized by flanges adapted to merely overlie the marginal surface edges of sink decks. Anent such sink bowl structures, numerous attendant difficulties are generally associated therewith since they are not designed and/or adapted to compensate for irregularities, e. g., waves, ripples, bumps, etc., which may be inherently self-contained and/or which may be present in the surfaces of sink deck compositions. Such irregularities lead to the undesirable effects caused by water seepage and the problem is particularly acute with respect to the relatively hard plastic-type sink deck compositions that have received wide acceptance and extensive use in recent years. Moreover, there is always present a continuous, vertical projecting edge of the flange above the sink deck which forms a crevice for the collection and/or retention of water, food particles, etc., thereby hindering the disposal and/or removal thereof from the sink deck. Upon prolonged usage, an unsanitary condition arises necessitating remedial procedures. Attempts have been made to partially obviate or mitigate this undesirable failing by tapering the vertical projecting portions of such flanges in an effort to approach the attainment of a substantially plane and smooth surface between the sink deck and sink bowl. However, a projecting vertical edge and crevice still remains and excessive tapering often results in a flange edge which is extremely sharp and therefore capable of inflicting injury to a person removing debris along the sink deck into the sink bowl. In addition thereto, tapering the outer edge of such flanges reduces somewhat the amount of pressure which may be exerted upon the flange through various clamping arrangements utilized to effect a sealing engagement between sink deck and sink bowl.

In attempts to avoid or circumvent the foregoing disadvantages, it has been proposed to scarf or countersink the sink deck composition material and insert the flange of a sink bowl flush against the vertical edge of the sink deck composition defined by the portion scarfed out, i. e., the recessed area. Generally, this type of installation is not only expensive but requires the utmost precision in scarfing or countersinking the sink deck composition by the sink deck manufacturer or the skilled artisan and the slightest deviation from a true cut permits the occurrence of water seepage. No allowance is provided for tolerable error and a premium is put on accuracy. Furthermore, any settling or "give action" with respect to the various clamping devices usually employed in the installation of such sink bowl structures is conducive to creating or opening an area for water seepage.

Other procedures which have been advanced for preventing undesirable effects caused by water seepage between sink bowl and sink deck comprise the utilization of separable moldings, often referred to as sink rims or sink frames, e. g., the Hudee-type sink rims well known to those skilled in the art, wherein a continuous metal frame conforming to the configuration of the sink bowl flange is superimposed over and around the flange and the marginal surface edge of a sink deck. Various clamping arrangements have been suggested in an effort to obtain increased resistance to water seepage, debris formation, etc., in such systems. However, utilization of separable moldings are accompanied by many of the disadvantages set forth hereinabove, e. g., they involve additional expense, i. e., the cost incurred in purchasing the separable moldings, they are generally incapable of compensating for the irregularities mentioned hereinabove, and they often require the service of a skilled craftsman to insure proper installation. Furthermore, an additional and undesirable crevice is formed, i. e., a crevice is formed not only between the molding or sink rim and sink deck but also between the molding and sink bowl, and thus permits further collection of water, debris, etc. Where engagement is desired between sink decks having nonmetallic surfaces, e. g., hard plastic counter top compositions, and metallic sink bowls, the problem becomes particularly difficult since welding, brazing, etc., techniques cannot be satisfactorily and conveniently used to effect a necessary water-tight bond. In view of the foregoing, the art has long sought a low cost unitary sink bowl structure adapted to effect a water-tight sealing engagement with a sink deck without the necessity of resorting to the use of expensive installation procedures requiring the skill of an expert craftsman or conventional and relatively expensive auxiliary separable moldings. Although many attempts have been made to overcome the foregoing difficulties and other difficulties, none, as far as I am aware, was entirely successful when carried into practice commercially on an industrial scale.

It has now been discovered that a low cost unitary metallic sink bowl unit having a resilient and continuous flange of special structural arrangement can be provided which is capable of effecting a unique, water-tight, self-sealing engagement with a sink deck and which is adapted for facilitation of installation by the ordinary layman, thereby eliminating the incurrence of expensive installation procedures and/or use of auxiliary separable moldings and disadvantages normally associated therewith.

It is an object of the present invention to provide a unitary, corrosion-resistant, metallic sink bowl structure characterized by a resilient flange of novel configuration adapted to provide a water-tight, self-sealing engagement with a sink deck surface.

Another object of the invention is to provide a single-piece, corrosion-resistant sink bowl structure having a resilient, continuous flange of special design and capable of compensating for irregularities in a sink deck composition and in the sink bowl itself to thereby provide a water-proof self-sealing engagement between the sink bowl structure and a sink deck.

The invention also contemplates providing a metallic and corrosion-resistant unitary sink bowl unit having integrally associated therewith a resilient and continuous flange of special design and adapted to facilitate installation of the sink bowl in a sink deck opening without recourse to the utilization of separable moldings and/or expensive installation procedures necessitating the skill of an artisan.

It is a further object of the invention to provide a corrosion-resistant sink bowl in the wrought form comprised of stainless metal and having an improved configuration of novel design adapted for economic production and further characterized by an integral and outwardly-extending resilient and continuous flange of special structural arrangement capable of effectuating a water-proof joint with a sink deck when installed in a sink deck opening.

The invention further contemplates providing a single-piece sink bowl which is adapted for economical production by a single deep-drawing operation and which will retain its form when so produced from commercial stainless or corrosion-resistant metals or alloys.

It is another object of the invention to provide a unitary sink bowl having a special design or structural formation and offering other important advantages and economies incident to its structural cooperation in facilitating installation in a sink and drainboard assembly.

Another object of the invention is to provide a unitary sink bowl structure and drainboard assembly wherein the sink bowl has an integral, resilient and continuous flange of special design outwardly extending in a substantially horizontal plane which, in cooperation with an improved clamping device adapted to facilitate ease of installation, functions as a self-engaging member with the surface of the sink deck.

Other objects and advantages will become apparent from the following description taken in conjunction with the accompanying drawings in which:

Fig. 1 depicts a fragmentary perspective view of a sink bowl;

Fig. 2 is a vertical sectional view taken on line 2—2 of Fig. 1;

Fig. 3 is a vertical sectional view taken on line 3—3 of Fig. 1;

Figs. 4, 5 and 6 illustrate a frontal view of a preferred flange embodiment of a sink bowl and are illustrative of the flange in successive stages of installation;

Fig. 10 is an enlarged view of the flange to illustrate the flange as having an unbeveled edge;

Fig. 11 is an enlarged view of the flange to illustrate the flange in beveled form;

Figs. 12, 13 and 14 are views in detail of a modified structure of a sink bowl embodying the outwardly curved side and end walls of the sink bowl structure of Figs. 9 to 11 with the further modification consisting in downwardly or outwardly curving of the bottom wall of the bowl. In the illustration of this modified structure:

Fig. 12 is a horizontal sectional view taken on line 12—12 of Fig. 13;

Fig. 13 is a central, vertical sectional view of the modified sink bowl taken on line 13—13 of Fig. 12;

Fig. 14 shows a cut-away perspective view of the modified structures of Figs. 12 and 13;

Figs. 15, 16 and 17 are views illustrating a preferred flange embodiment of the present invention in combination with the preferred sink bowl. In the illustration of this structure:

Fig. 15 is a plan view thereof and Figs. 16 and 17 represent front and side views, respectively, of Fig. 15;

Fig. 18 is a view illustrating a preferred clamping device affixed to a sink bowl;

Fig. 19 is a vertical sectional view in side elevation taken on line 19—19 of Fig. 18;

Fig. 20 is a perspective view illustrating a bracket and bolt assembly of the clamping device;

Fig. 21 is a perspective view illustrating the bearing plate member of the clamping device;

Fig. 22 is a sectional view on line 22—22 of Fig. 18;

Fig. 23 is a sectional view on line 23—23 of Fig. 18;

Figure 7:
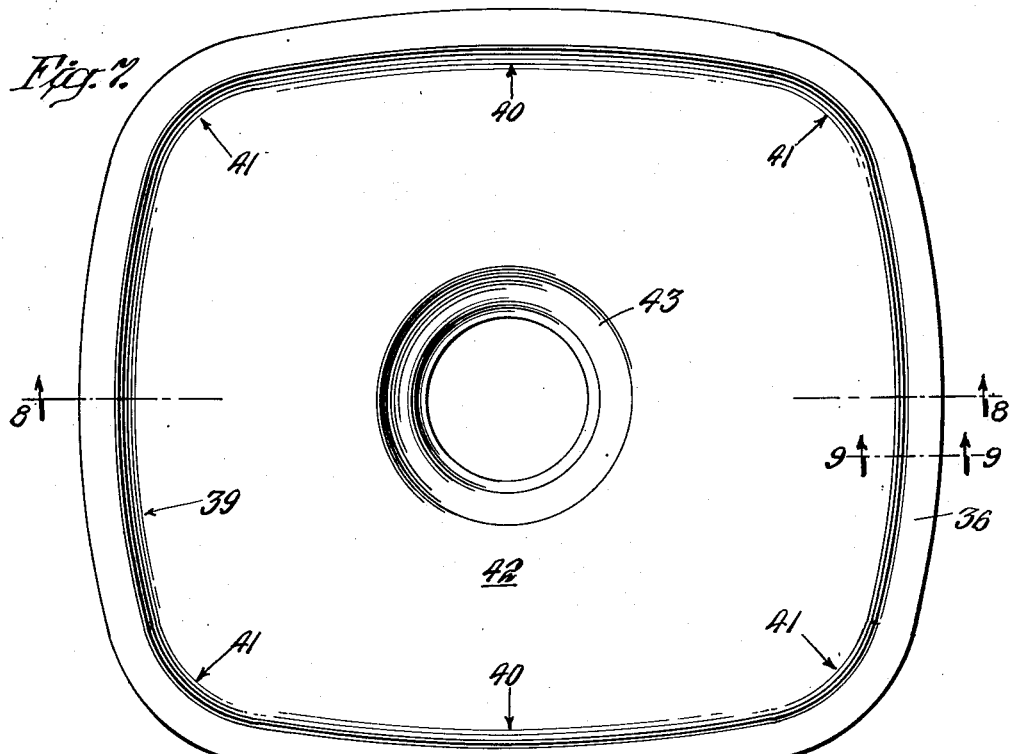
Fig. 7 illustrates a plan view of a preferred sink bowl made in accordance with the present invention.

Figs. 24, 25 and 26 (shown with parts broken away for purposes of clarity) illustrate the preferred locationing of the fastening means of Figs. 18 to 23 to the preferred sink bowl and flange and further illustrate successive stages in the installation thereof; and Fig. 27 depicts a plan view of a modification adapted for twin-bowl assembly.

Broadly speaking, the present invention contemplates the provision of a unitary, corrosion-resistant, wrought alloy sink bowl structure, preferably formed by drawing or pressing stainless metal sheet of relatively light gauge. The novel structure generally comprises a depressed bowl of desired depth and confined or enclosed by substantially vertical walls which integrally extend outwardly in substantially a horizontal plane to form a resilient and continuous flange of preferred width and having a cold-worked structure, the outer free edge of which terminates in a downturned portion, thereby being capable of providing a resilient, water-tight, self-sealing engagement with a sink deck opening. Preferably, the unitary sink bowl has each of its side and end walls slightly arcuate in contour and corner structures with the enlarged radius of curvature designed to permit of substantial economies in the production of the bowl by a single deep-drawing operation as will be explained more fully hereinafter.

A unique feature of the invention is the high degree of resiliency or "give" exhibited by the flange and this feature, particularly in combination with a flange of preferred width and having a downturned outer free edge, is extremely efficacious in preventing seepage of water between a sink deck and sink bowl and particularly water seepage which may have been hitherto attributed to, for example, irregularities self-contained in sink bowls and/or present in sink deck surfaces. In other words, due to the novel flange being characterized by a cold-worked structure, there is, in accordance with the present invention, an unbalanced stress pattern induced in the flange which is conducive to imparting the characteristic of resiliency thereto and this property of resiliency enables the flange to exhibit a relatively high degree of manipulative flexibility during installation operations such that it is readily capable of compensating for waves, ripples, bumps or other irregular formations either self-contained or present in sink deck surfaces, and it is also readily capable of easy installation to form a water-tight joint. Moreover, the comparatively rough, vertical and/or tapered vertical projections and the afore-described disadvantages associated therewith which have been characteristic of flange edges of prior art sink bowls or auxiliary separable rims employed in conjunction therewith are eliminated by the present invention. When the downturned outer free edge of the flange bites into a sink deck surface during the installation thereof, only the smooth surface of the sink bowl flange is exposed thereby facilitating removal of water, debris, etc., from the sink deck surface into the sink bowl. Furthermore, a flush jointure is formed between a sink deck and sink bowl, such that the sink deck and flange are in substantially planar alignment. This factor contributes significantly to the achievement of a sealing engagement which is not only impervious to water penetration but is also highly sanitary and pleasing in appearance.

In accordance with the concepts of the present invention, the width of the flange is preferably not greater than about 1¼ inches. I have found that for achieving optimum sealing engagement effectiveness the width of the flange takes on special significance when the flange is under external tension, e. g., tension created by pressure exerted through clamping arrangements or devices when the sink bowl structure is finally installed in a sink deck opening. When the flange rests on the sink deck surface prior to application of clamping pressure, the downturned outer edge is in contact with the deck surface. As pressure is applied, the marginal edge of the sink deck opening also comes into contact with the flange while the outer downturned edge simultaneously bites into the sink deck. When the width of the flange appreciably exceeds about 1¼ inches, the point or line of contact at the aforementioned marginal edge acts as a fulcrum point and as the pressure is increased, an opposing pressure tends to be created or induced at the point where the downturned edge of the flange bites into the sink deck. This so-termed opposing pressure tends to lift or raise the downturned edge from the sink deck and, as a result thereof, achievement of an effective sealing engagement is impeded. However, the fact that the outer edge of the flange is downturned materially assists in overcoming this opposing action under pressure since it prevents premature contact between the marginal edge of the sink deck opening and the flange as pressure is applied. In addition thereto, it is preferable that the width of the flange be not appreciably less than about ¾ inch to thereby insure a tolerable margin for ease of installation and sufficient application of pressure to effectuate a sealing engagement with the sink deck.

In a preferred embodiment of the flange characterized by a high degree of resiliency and having its outer edge downturned, it is further contemplated in accordance with the present invention that the level of the downturned outer free edge of the flange about or extending along any center portion or section of said edge between adjacent corner portions thereof be below the level of the adjacent corner portions. In other words, this special configuration of the downturned outer free edge of the flange is such that when the sink bowl structure is inserted in a sink deck opening prior to the application of any external pressure, the center sections of the downturned outer edge of the flange intermediate of adjacent corner sections thereof rest on or contact the sink deck surface while the aforesaid adjacent corner sections are in slight elevation and above the sink deck surface. This condition may be termed, for purposes of convenience, a "bowed effect" or "bowed contour" along the outermost edge of the flange, i. e., the downturned edge, and is illustrated in principle in the accompanying drawings.

Referring more particularly to Fig. 1, a sink bowl structure is illustrated having substantially vertical side and end walls 30 and 31, respectively, united by vertical corners 32. Bottom wall 33 having the usual downwardly flanged drain opening 34 is joined to the side and end walls by lower corners 35. The bowl at its upper marginal edge extends outwardly to form an integral, continuous, substantially horizontal projecting flange generally designated by the reference character 36 and having its outer free edge 37 downturned. The aforedescribed "bowed effect" is more clearly depicted in Figs. 4, 5 and 6, which also illustrate the position of the flange in various successive stages of installation, i. e., the first stage is illustrated in Fig. 4 where the flange is located above a sink deck 38, the second stage is illustrated in Fig. 5 where the flange is in initial engagement with the sink deck and the third stage is depicted in Fig. 6 where the flange is in complete engagement with a sink deck. With reference to Fig. 4, it will be observed that the downturned outer free edge 37 of the flange is represented in various segments extending from and along the center sections 37–a thereof through sections 37–b and 37–c and finally to the corner section 37–d of the downturned outer edge. The level of each succeeding segment or section is shown as being higher than the one preceding, i. e., the level of the outer downturned edge at section 37–c is higher than the level at section 37–b which, in turn, is higher than the level of the outer downturned edge at or along its center section 37–a. The maximum differential in levels of the downturned edge occurs between corner section 37–d (highest) and center section 37–a (lowest). The right-hand portion of Figs. 4 and 5 illustrates the bowed contour of the downturned edge of the flange, as it is viewed from a corner section towards a center section and away from an observer. Thus, it will be seen that vertical corner section 32 of the bowl, represented by dotted lines for purposes of clarity of representation, extends outwardly into flange 36 which terminates at its outer free edge into downturned corner section 37–d. The center portion of side wall 30, represented by dotted lines, is also shown extending into flange 36 and terminating at its downturned outer free edge section 37–a.

It is to be further noted that the included angle formed between flange 36 and confining walls 30 and 31 varies in amount of angular deflection in a decreasing manner from the corner portion 32 of the sink bowl towards the center wall portions thereof, i. e., the angle formed between the flange and bowl gradually decreases when viewed along the angular path described therebetween and extending from the corners of the sink bowl structure to the center portions thereof. As can be best seen from Figs. 2 and 3, it will be observed that angle "X" representing an angle formed between the flange and corner 32 of the bowl is greater than angle "Y" which depicts an angle between the flange and center portion of the side wall 30. It is to be understood that the angle formed between the flange and the center portions of the sink bowl, e. g., angle "Y," progressively increases towards adjacent corner portions of the sink bowl structure (see Figs. 4 and 5).

When suitable clamping procedures are used, as will be described hereinafter, in conjunction with the "bowed contour" downturned edge, a unique, uniform sealing engagement is effectuated between sink bowl and sink deck. As pressure is continuously applied during installation, the corner sections 37–d of the downturned outer edge of the flange are pulled downwardly in a manner continuously approaching the level of the downturned outer edge of the flange defined by the center sections 37–a thereof while simultaneously the center sections are in continuous biting engagement of increasing penetration or depth with the sink deck surface. With the application of sufficient external pressure the level of the downturned outer edge of the flange at the corner and center portions would lie in a horizontal plane, i. e., the downturned outer edge would continuously lie on a smooth plane surface. A flange characterized by this unique configuration, i. e., an outer free downturned edge of bowed contour, is particularly advantageous in providing a water-tight seal since not only is there obtained in assembly a downward pressure from a clamping device, but, in addition thereto, a "spring action" or tension is created or induced in the curvature of the flange. As a result of this spring action characteristic, the flange, in effect, is capable of exerting and maintaining upon installation a self contained pressure, i. e., a pressure which may be considered independent of the external pressure that may be applied via a clamping device. Should there be any settling or give to a clamping device, the pressure induced or provided by the spring action effect would materially assist in affording and maintaining pressure engagement with a sink deck during its service life, thereby insuring a water-tight seal. The spring action or tension effect and the benefits derived therefrom result primarily from the high degree of resiliency of the flange having a cold-worked structure because it is mainly the property of resiliency which is conducive of the pliant or flexible nature of the flange, i. e., the flange, in effect, is capable of stretching and bending as external pressure is exerted during the installation operation.

In carrying the present invention into practice, it is contemplated to provide a novel sink or bowl of single-piece construction formed by drawing or pressing sheet metal of relatively light gauge and which may desirably be a stainless or corrosion-resistant metal or alloy, such as the nickel-copper alloy known and sold under the trademark of "Monel," or other suitable corrosion-resistant metal alloys, such as nickel-chromium or nickel-chromium-iron alloys, or other suitable stainless metal, such as stainless steel, or metals or alloy having corrosion-resistant metallic surfaces.

In producing sink bowls of the drawn type, i. e., having an as-drawn shape, it is well known in the metallurgical art that it is quite difficult to work, draw, etc., stainless type metal or alloys because of the hardness and toughness of such materials as distinguished from comparatively easily workable plain sheet iron or steel, copper, zinc, etc. In the manufacture of deep drawn, one-piece sink bowls of stainless or corrosion-resistant metals or alloys and of generally rectangular type, as heretofore practiced, it has been found necessary to employ a multiple-step drawing operation with intermediate annealing to soften the work-hardened metal and to avoid unbalanced stress deformation or buckling or crinkling or tearing of the walls in the finished product. The method commonly employed involves the use of a first draw, then an anneal to avoid or to relieve the unbalanced stresses and then a final draw. Such method not only involves multiple-draw operations in forming the bowl, but further, incident to the annealing, requires cleaning to remove oxide and scale prior to the final draw and additional polishing work to remove oxide film to obtain a satisfactory surface on the finished product.

An important feature of a preferred sink bowl involves the discovery that a sink bowl, when made of a special formation or design, permits of its being produced as a finished product in a single or one draw operation. The discovery contemplates a sink bowl having each of its side walls slightly arcuate in contour and of such a form as to resist deformation as a result of unbalanced stresses set up in the drawing operation. By arching the side walls and by providing associated enlarged radial corners, a sink bowl can successfully be produced with substantial economies in a single drawing operation. As will be apparent, very substantial economies are effected, particularly as related to the elimination of the heretofore required step of annealing with the resultant necessity of cleaning and polishing. Moreover, the arching or outwardly curving of the side walls in arresting deformation from the pressed contour, in addition to permitting single draw production, offers a further and permanent advantage in added resistance to deformation of the bowl in handling, shipping and using.

Furthermore, a sink bowl having outwardly bowed walls eliminates other prior art shortcoming. For example, the occurrence of what is known as a "collapsing effect" is prevented, i. e., the tendency for the side and end walls to snap inwardly without the application of external pressure when the die is removed from the sink bowl; the occurrence of "oil can" flexures, i. e., the snap similar to that obtained when pressing on the bottom of an oil can, is prevented when the side and end walls of the sink bowl are under pressure; and the occurrence of "hollow sound" effects, i. e., a sound similar to that obtained when water from a hose is sprayed against the interior of a hollow metal barrel, is obviated or substantially minimized and this is a practical feature of commercial significance and is attributable to the resilient characteristic of the sink bowl as it seems that it induces a deadening effect in the unit.

Figure 8:
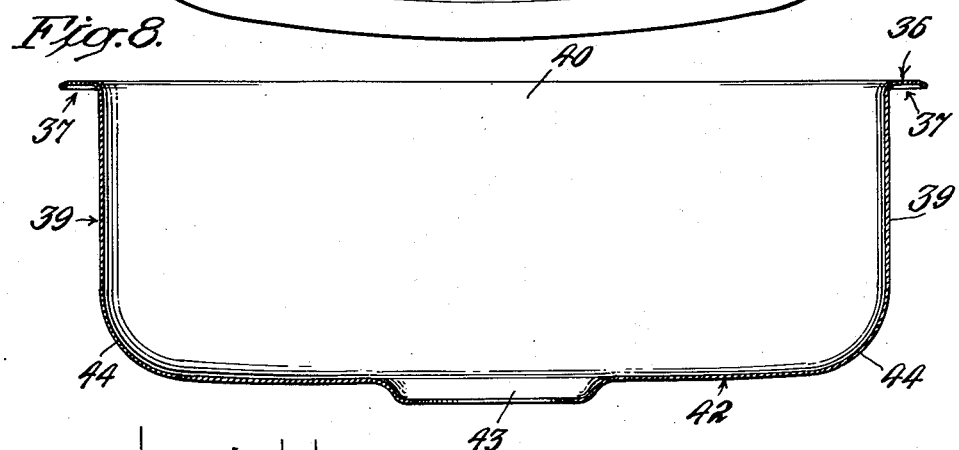
Fig. 8 is a central vertical section taken on line 8—8 of Fig. 7.
Figure 9:
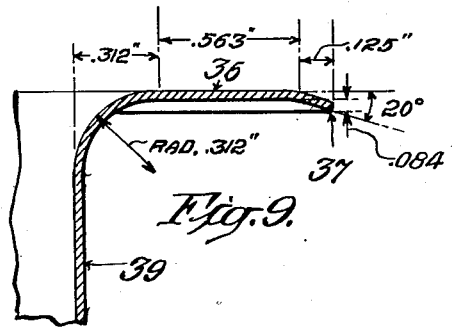
Fig. 9 is an enlarged sectional view in detail on line 9—9 of Fig. 7.

For the purpose of giving those skilled in the art a better understanding of a sink bowl produced in accordance with the principles of the present invention, reference is made to the drawings and particularly to Figs. 7 to 14. As shown in Figs. 7 and 8, the unitary sink bowl structure is of substantially rectangular configuration, having substantially vertical side and end walls 39 and 40 which have a convex curvature or slight arching in the horizontal plane. The side and end walls are integrally united by connecting corner portions or fillet sections 41 having a curvature of generous or accentuated radius, preferably of a radius of curvature not appreciably exceeding about four inches and not substantially less than about 2½ inches. The side and end walls are integrally joined to bottom wall 42, provided with the usual downwardly flanged drain opening 43, by curved lower corner portions or fillet sections 44 of enlarged radius of curvature and preferably not in excess of about 2½ inches and not less than about 1¾ inches. The bowl is formed at its upper edge with an outwardly-projecting, marginal, horizontal flange 36 which is integral with the side and end walls and terminates at its outer free edge in downturned portion 37. The flange which is shown in detail in Fig. 9 preferably does not exceed, as stated hereinabove, about 1¼ inches in width and a width of about 1 inch is highly satisfactory. The provision of a flange of substantial width or projection from the body of the bowl permits of a wide tolerance in the formation of the deck opening without impairing the security and appearance of the final assembly. It is preferable that the downturned outer free edge of the flange be beveled as illustrated in Fig. 11 at location C in contrast to the unbeveled downturned edge at location D shown in Fig. 10. By beveling the outer free edge, a more effective biting engagement and penetration into a sink deck surface is provided whereby a highly satisfactory water-proof sealing engagement is obtained. It is to be noted that flange 36 is shown (see Fig. 9) as lying in a horizontal plane such that it would be parallel to the plane surface of a sink deck. However, it can be slightly arcuate in contour to assist in preventing premature contact between the flange and the marginal edge of a sink deck opening.

As a result of the special design and contour of the bowl, an important production advantage is attained in that it permits of the production of a substantially rectangular type of bowl in a single deep-drawing operation. The special outwardly curved contour of the end and side walls associated with the enlarged radius junction portion 41 permits of the economical single draw production of the unitary bowl. The side and end walls so formed are self-sustaining with relation to the formed contour and are of a character to resist deformation as a result of unbalanced internal stressing or surface stressing of the metal. The contour of the bowl having side and end walls of outwardly curved arcuate formation enables the single draw production as will be understood by eliminating the necessity of relieving of unbalanced stresses incident to the deep-drawing operation, such as by annealing.

As an example of a modified structural embodiment of the improved sink bowl there is shown in Figs. 12, 13 and 14 a sink bowl unit designed to permit of its production in a single drawing operation. The bowl preferably has overall inside dimensions of approximately sixteen inches in width and eighteen inches in length and a bowl depth of about seven inches. The modified bowl unit is composed of substantially vertical side and end walls 39 and 40 which are outwardly curved in a horizontal plane. The curvatures of the side and end walls are of extremely large radii and are indicated by reference character A as major curved sections. In a desirable practical embodiment, the curvature of the side walls 39 may be defined by a curvature having a radius of, for example about 23.5 inches, and the end walls 40 may be desirably defined by a curvature having a radius of, for example, about 33.5 inches. In this modified structure illustrated in Figs. 12 to 14, inclusive, the bottom wall 42 is likewise shown having an outwardly or downwardly curved contour which is also indicated by reference character A as a major curved section or panel. It is preferable to use a relatively large radius of curvature for the downward contour of the bottom wall. The bottom wall 42 at its central portion is provided with the usual downwardly flanged drain opening 43. At the upper edge of the side and end walls the bowl is integrally formed with the outwardly projecting marginal horizontal flange 36 which may, for example, desirably be of a thickness of about $32/1000$ of an inch. As shown in Fig. 13, the marginal flange 36 is arched upwardly in its cross section with its outer or free edge 37 downturned and this structural formation is advantageous in avoiding premature contact between the flange and marginal edge of a sink deck opening as mentioned hereinbefore. This flange 36 is designed for biting engagement with the upper surface of the deck at the frame of the opening and has substantial projection outwardly from the walls so as to provide a continuous molding of pleasing appearance. It likewise is employed to cooperate in the clamping of the bowl in a rigid installation by means of suitable clamping means described hereinafter. The side, end and bottom wall sections of major curvature, as in the instance of the bowl structure illustrated in Figs. 7 and 8, are united by a plurality of minor curved sections or minor curved fillet sections indicated by reference character B which, as shown, have relatively enlarged radii and join the front and rear side panels to the end panels or sections 40 and likewise join all of said panels to the curved bottom section to form a self-sustaining outwardly contoured bowl structure.

For a more graphic delineation and appreciation of the degrees of curvature of the improved sink bowl, there are embodied in Fig. 12 dot and dash rectilinear or constructional lines particularly to indicate the relative curvatures of the side and end wall sections.

Figs. 15 to 17, inclusive, illustrate a preferred sink bowl and flange structure having the outwardly or arcuately bowed side and end walls 39 and 40, respectively, extending outwardly into the flange 36, the outer downturned edge 37 of which is characterized by the aforedescribed "bowed contour" and illustrated by section 37–a, the lowest level (center flange portion) of the outer downturned edge, sections 37–b, 37–c and 37–d, the highest level (corner flange portion) of the outer downturned edge.

In the manufacture of a preferred sink bowl as illustrated in Figs. 7 and 8 and in accordance with the present invention, corrosion-resistant stainless alloy sheet, e. g., "18–8" type "302" stainless steel of about 20 gauge and of predetermined size, can be employed and circle sheared to the diameter of the blank size to be used in the drawing operation. The circled blanks are preferably coated with a drawing compound and then fed into a press. A double action press, e. g., about 400 tons capacity, can be employed wherein the initial stroke sets the blank holder and the secondary stroke operates the punch. The blank holder holds the blank in position and the punch forms the metal to the desired predetermined measurements of the sink bowl. As a result of the drawing operation, there is a work hardening result in the metal of the flange which assists in subsequent operations in providing an integral molding or flange. The bowl can be then trimmed such as by subjecting it to the action of a single action press wherein the male portion of the trim die is inverted and remains stationary while the action of the press moves the cutting steels downwardly and thereby trims the flange to a predetermined outside dimension. Since the metal is under stress from the drawing operation, it is preferred to employ a trimming die which is relatively large and heavy to insure the prevention of the sink bowl of taking a distorted shape. To effect the outer downturned edge, the trimmed or shaped bowl flange is bumped such as by subjecting it to the action of a press. The bump die crimps the flange uniformly turning it down sharply from the outside radius. The bumping operation assures the attainment of a properly arched flange and, in addition thereto, provides added strength and resiliency to the center sections of the flange which are highly desirable, particularly where light gauge metal is employed. For optimum effective biting engagement between the downturned edge of the flange and a sink deck, it is preferable to bevel the downturned edge as described and for reasons set forth hereinbefore. The amount or degree of beveling may be easily predetermined when such factors as hardness of the composition of the sink deck material are known. A suitable drain opening is provided in any convenient manner and the sink bowl is subjected to cleaning and buffing operations well known to those skilled in the art.

In providing a sink bowl structure having a downturned flange edge of bowed contour, the female and male dies employed in the drawing operation should be of a configuration and be positioned relative to each other in the drawing action such that greater cold working of the metal is developed in the corner portions of the sink bowl and flange than in the intermediate side portions thereof to thereby impart greater stressing of the flange metal at the corner areas. Trimming the flange provides a more pronounced bowed contour since there is a relaxation of the stresses induced in the flange as a result of the trimming operation, and since there are less stresses in the side walls of the bowl as compared to the corner fillet sections, the level of the corners of the flange remains higher than the level of adjacent or intermediate center sections of the flange. The bumping operation puts further cold work into the metal of the flange and, in addition, provides, as mentioned hereinabove, added strength and resiliency.

It is important in achieving highly satisfactory results that the thickness of the metal sheet to be drawn preferably does not exceed about 0.043 inch and not be less than about 0.025 inch. Observance of this feature assures the attainment of a thin metallic structure and thinness of metal is important in providing the required characteristic of resiliency and a downturned edge which will effectively bitingly engage a sink deck while affording a low cost sink bowl unit having the necessary strength and rigidity to resist deformation tendencies induced by internal or self-contained stresses and external pressures exerted by clamping devices, water pressure, weight of dishes, etc. Moreover, the height of the arch of the flange, shown by way of example in Fig. 9 as 0.084 inch, should not be greater than about three times the thickness of the metal in order to insure easy removal of water and debris from a sink deck into the sink bowl and to insure a proper arching of the flange such that it will be capable of effectively providing the desired self-sealing engagement with a sink deck and also assist in preventing premature contact between the flange and marginal edge of a sink deck opening. Furthermore, the radius of curvature of the flange, illustrated by way of example as 0.312 inch in Fig. 9, in relation to the thickness of metal should not be greater than about 0.5 inch and not less than about 0.25 inch. The radius of the curvature of the flange generally varies with the thickness of metal. If the radius is too great, difficulty is experienced in obtaining a suitable flange width, e. g., a width of about 1 inch. On the other hand, proper arching of the flange would be difficult if the radius of curvature were too small.

In the assembling and installing of a sink bowl in a drainboard opening in accordance with the invention, a preferred and improved fastening means or clamping device is provided as depicted in Figs. 18 to 22 and pictorially illustrated during successive stages of installation as shown in Figs. 24 to 26, inclusive.

The clamping device or securing means generally comprises a bearing plate 45 which may be affixed to the walls of a sink bowl by any suitable means, e. g., welding. Depending integrally and outwardly from bearing plate 45 are upper opposed flange portions 46 having inturned outer edges 47 and lower opposed flange portions 48 having inturned outer edges 49. Adapted for cooperative registration with bearing plate 45 there is provided a separable and demountable bracket or clamping member, generally designated as 50, adapted to be received by or inserted in flange portions 46 and 48 of bearing plate 45. Bracket member 50 is comprised of upper and lower wall portions 51 and 52 which terminate in outwardly extending flange portions 53 and 54, respectively. Flange portion 53 is provided with an elongated slot or aperture 55, preferably oblong or elliptical in shape, which is adapted to receive clamping bolt 56. The oblong or elliptical aperture 55 is beneficial in providing for a desired wide latitude of movement of bolt 56 such that maximum flexibility is permitted in contacting the underside of a sink deck surface. Bolt 56 is provided with a swivel, conical bearing or seat 57 of such a nature that the seat will adapt itself readily to irregular surfaces of the underside of a sink deck. Lower flange portion 54 is also provided with an aperture 58 for receiving bolt 56. Above flange member 54 and integrally depending from wall 52 is a downwardly and outwardly-extending projection 59 adapted to bear against nut 60 which threadably receives bolt 56. Nut 60 assists in permitting the aforementioned desired latitude of bolt movement since it is adapted to act in combination with flange member 54 and projection 60 as a fulcrum or center point for movement of bolt 56 as shown by way of example in Fig. 19.

As shown in Fig. 21, the outer faces of upper and lower flanges 46 and 48 are preferably downwardly and inwardly inclined in substantial vertical alignment to effect maximum resistance and pressure against bearing edges 61 and 62 of upper and lower walls 51 and 52, respectively, of bracket member 50. Walls 51 and 52 are also preferably downwardly and inwardly inclined to insure that the underside of outwardly extending flange 53 can, if need be, bear against and be supported by the top horizontal edges of the upper opposed flanges 46. Thus, maximum pressure can be applied or exerted during the installation operation to effect a tight engagement between sink bowl and sink deck while avoiding the occurrence of excessive wedging, i. e., the tendency for wall portions 51 and 52 to pull down and away from upper and lower flanges 46 and 48. The clamping bolt 56 is freely received by upper and lower flange portions 53 and 54 of bracket 50 and is threaded for a substantial distance. The lower end of the bolt is suitably provided with a gripping portion 63 for facilitating the manipulation of the bolt in the tightening operation. When the bolt is tightened, a downward clamping pressure is applied to the bearing plate 45 by the nut 60 while an upward clamping pressure is exerted on the underside of the sink deck surface.

In the installation of a sink bowl characterized by a flange having a bowed contour structural formation along its outer downturned edge as described previously herein, a unique and most satisfactory assembly arrangement is provided as can be best seen by reference to Figs. 24 to 26. In this assembly arrangement, the securing means or fastening device (Figs. 18 to 23) is selectively positioned along and affixed to each of the corner or fillet sections of the sink bowl. The selective positioning of the fastening device has been found to be highly advantageous in providing an effective, water-proof sealing engagement since it immeasurably assists in insuring the attainment of the aforedescribed spring action or tension effect in the flange. Moreover, the selective positioning of the clamping device provides for obtaining a highly effective distribution of clamping pressure during the installation operation while employing a minimum number of clamping devices. The fact that only four clamping devices are required in such an assembly rather than the common prior art use of six or eight clamping devices is of considerable economical importance to both manufacturer and consumer. Furthermore, selective positioning of the clamping device to the fillet or corner sections facilitates the installation of a sink bowl in a sink deck opening. In the usual prevailing practice wherein several clamping devices are affixed to each of the walls, the installer often finds it difficult to gain access to and to manipulate the clamping device during the installation operation. Selectively positioning the clamping device, as referred to herein, obviates such difficulties since the installer has ready access to the clamping device as will be readily understood. During the installation operation, pressure is applied gradually and uniformly by alternately screwing up each of the clamping devices incrementally to thereby obtain a continuous, uniform and tight-fitting biting engagement between the flange and sink deck surface. Although it is preferred to employ the fastening or clamping device depicted in Figs. 18 to 23 in the aforedescribed assembly arrangement, it is to be understood that other clamping devices could be employed. It is also to be understood that in sink bowl and drainboard assemblies contemplated in accordance with the present invention, assembly arrangements other than the selective positioning type may be employed. Suitable drainboard or sink deck openings may be provided in accordance with my U. S. Patent No. 2,646,575.

It is to be observed that the present invention provides a unitary sink bowl structure in the wrought form and having a flange of such resiliency that it is capable of providing a unique, water-tight, self-sealing engagement with a sink deck and the installation thereof may be readily accomplished by a layman since the heretofore practice of employing special scarfing procedures and/or separable moldings is eliminated. The flange is characterized by a combination of structural features including a downturned outer free edge, a cold-worked structure and a preferred width not substantially greater than about 1¼ inches. These structural features act cooperatively to provide a resilient flange of such a nature that it is capable of compensating for irregularities that are self-contained and/or present in a sink deck surface. In a preferred embodiment, the flange is further characterized in having a downturned edge of bowed contour structural arrangement such that the level of the downturned edge at sections intermediate adjacent corner sections thereof is below the level of the adjacent corner sections. This feature permits the attainment of a highly satisfactory, leak-proof, self-sealing engagement as set forth hereinbefore.

Furthermore, the invention provides a unique, unitary sink bowl unit having a bowl of special configuration in combination with the foregoing resilient flange. The bowl is provided in the as-drawn shape from thin, corrosion-resistant, stainless metal or alloy, preferably nickel-containing, and the vertical side walls of the bowl are of arcuate contour or outwardly curved in the horizontal plane, the walls being integrally joined by fillet sections of generous radius. The walls are self-sustaining anent the formed contour and resist deformation caused by the stresses induced via the drawing operation. Thus, expensive operations such as annealing, polishing, etc., are avoided.

Moreover, the invention provides a special sink and drainboard assembly wherein an improved clamping device and a flange having the aforedescribed bowed contour act in unison for rigid clamping of the sink bowl in assembled position. By affixing and positioning the clamping device described hereinabove to the vertical corner sections of the sink bowl and below the corner portions of the bowed contour flange a minimum number of clamping devices are required in securing the bowl to a sink deck. Thus, highly satisfactory results are obtained at a minimum of expense and assembly of sink bowl and sink deck is greatly facilitated.

The present invention is a continuation-in-part of my copending patent application Serial No. 252,824, filed October 24, 1951, now abandoned, which, in turn, is a continuation-in-part application of Serial No. 108,270, filed August 3, 1949, now U. S. Patent No. 2,584,860.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. As illustrative of a suitable modification of the bowl structure, there is shown in Fig. 27 a suitable modification of the bowl employing the curvilinear or horizontally arched side wall contours as described hereinbefore but wherein the marginal flange is modified to have one straight edge 64 to adapt it for a twin-bowl assembly as illustrated. Thus, a series of sink bowls, i. e., multiple sinks, are contemplated. Ledge back type sinks are also contemplated within the scope of the invention, i. e., a sink bowl having a faucet structure mounted thereon.

I claim:

1. As a new article of manufacture, a unitary sink bowl structure having a sink bowl in the as-drawn shape adapted to be inserted in an opening in a sink deck, said sink bowl structure being comprised of thin, corrosion-resistant stainless metal having a depressed bowl curving outwardly at its upper marginal edge to form a resilient, continuous, outwardly-extending flange having a cold-worked structure and a width of about ¾ of an inch to about 1¼ inches, said flange being upwardly arched in cross section with its outer free edge turned downwardly and of bowed contour in a vertical plane such that the level of the center sections of the outer free downturned edge is below the level of adjacent corner sections of the downturned outer free edge thereby providing a flange adapted to maintain a resilient, water-tight, self-sealing engagement with an upper surface of said sink deck, said bowl having an approximate rounded rectangular contour in the horizontal plane and having side and end walls outwardly curved in a horizontal plane and a bottom wall of accentuated radius with a drain opening, said side and end walls being joined integrally to each other and to said bottom wall by curved fillet sections, the radii of outward curvature of said side and end walls being substantially greater than the radii of curvature of said fillet sections, whereby the as-drawn shape of said sink bowl is maintained despite the stresses effectuated in the as-drawn structure thereby avoiding the need of heat treatment to relieve such stresses.

2. As an article of manufacture, a unitary corrosion-resistant sink bowl unit in the wrought form, said unit having a depressed bowl provided with a drain opening in the bottom wall thereof and enclosed by substantially vertical walls of arcuate contour in a horizontal plane, said vertical walls integrally extending outwardly in substantially a horizontal plane to form a resilient and continuous flange having a cold-worked structure and its outer free edge downturned, said downturned edge having a structural contour such that the level of said edge at sections intermediate of adjacent corner sections of said downturned edge is below the level of said adjacent corner sections to provide a flange adapted to maintain a resilient, water-tight, self-sealing engagement with a sink deck surface, said walls being integrally and tangentially joined by fillet portions of generous radius, thereby providing a self-sustaining structure.

3. As a new article of manufacture, a unitary, corrosion-resistant sink bowl unit having an approximate rectangular contour sink bowl in the as-drawn shape adapted to be inserted in an opening in a sink deck, said unit having a depressed bowl curving outwardly at its upper marginal edge to form a resilient, continuous, outwardly-projecting flange having a cold-worked structure and its outer free edge downturned to thereby effectuate a resilient, water-tight, self-sealing engagement with a sink deck surface when installed in a sink deck opening, said sink bowl having substantially vertical walls of arcuate contour in a horizontal plane, said sink bowl and flange being further characterized in that the angle described therebetween from a corner section thereof to an adjacent center section is of diminishing degree along the angular path extending from said corner section to said adjacent center section.

4. As an article of manufacture, a unitary sink bowl unit in the wrought form, said unit being comprised of thin corrosion-resistant stainless alloy metal and having a depressed bowl provided with a drain opening in the bottom thereof and enclosed by substantially vertical side and end walls extending outwardly at their upper marginal edge to form a resilient and continuous flange having a cold-worked structure and a width of about ¾ of an inch to about 1¼ inches, said flange being upwardly arched in cross section with its outer free edge turned downwardly and of bowed contour in a vertical plane such that the level of the center sections of the outer free downturned edge is below the level of adjacent corner sections of the downturned outer free edge, thereby providing a flange adapted to maintain a resilient, self-sealing, water-tight engagement with an upper surface of a sink deck.

5. As a new article of manufacture, a unitary, corrosion-resistant sink bowl structure in the wrought form, said structure having a sink well with a drain opening in the bottom thereof and enclosed by substantially vertical walls, said vertical walls integrally extending outwardly in substantially a horizontal plane to form a resilient and continuous flange having a cold-worked structure and its outer free edge downturned, said downturned edge having a bowed contour structural arrangement such that the level of said downturned edge at sections intermediate adjacent corner sections of said downturned edge is below the level of said adjacent corner sections to provide a flange adapted to maintain a resilient, water-tight, self-sealing engagement with the upper surface of a sink deck.

6. As a new article of manufacture, a corrosion-resistant, single-piece sink bowl unit in the wrought form, said unit having a depressed bowl of predetermined size with an opening in the bottom thereof and enclosed by substantially vertical walls which integrally extend outwardly to form a substantially horizontally-projecting, resilient and continuous flange having a cold-worked structure and its outer free edge downturned to thereby provide a flange adapted to maintain a water-tight, self-sealing engagement with a sink deck surface, said sink bowl and flange being further characterized in that the angle described therebetween from a center section of said structure progressively increases along the angular path extending to adjacent corner sections of said structure.

7. A sink bowl and sink deck assembly comprising a corrosion-resistant, unitary sink bowl structure having a depressed bowl curving outwardly at its upper marginal edge to form a resilient and continuous outwardly-projecting flange having a cold-worked structure, said flange having its outer free edge downturned and of bowed contour such that the level of center sections of said downturned edge is below the level of adjacent corner sections thereof to thereby provide a flange adapted to maintain a resilient, water-tight, self-sealing engagement with a sink deck and fastening means affixed to said bowl for securing said sink bowl to a sink deck, said fastening means being selectively positioned beneath the corner sections of said flange and being under pressure which maintains the flange under tension and in resilient contact with the sink deck.

8. A sink bowl and sink deck assembly comprising a corrosion-resistant unitary sink bowl structure in the wrought form having a depressed bowl enclosed by substantially vertical walls extending outwardly at their upper marginal edge to form a substantially horizontally-projecting, resilient and continuous flange having a cold-worked structure and a width not greater than about 1¼ inches, said flange having its outer free edge downturned and of such structural contour that the level of the said downturned edge at sections intermediate of adjacent corner sections is below the level of said adjacent corner sections to thereby provide a flange adapted to maintain a resilient, water-tight, self-sealing engagement with a sink deck surface, and fastening means selectively positioned below the corner sections of said flange and affixed to said sink bowl for securing said sink bowl to a sink deck, said fastening means comprising bearing plate members having upper and lower opposed flange portions integrally projecting therefrom, demountable brackets adapted for slidable and cooperative bearing registration with said bearing plate flanges, said brackets terminating in outwardly-extending upper and lower flanges, clamping bolts adapted to be received by apertures in said bracket flanges, a projecting member integrally depending downwardly from said brackets, nut members adapted to threadably receive said clamping bolts and disposed above said lower bracket flanges and below said projecting members, said nut members being so positioned as to form a bearing engagement with said projecting members.

9. A sink bowl and sink deck assembly comprising a unitary corrosion-resistant sink bowl unit in the wrought form and fastening means affixed thereto for securing said sink bowl unit within a sink deck opening, said sink bowl unit having a depressed bowl enclosed by substantially vertical walls of arcuate contour on a horizontal plane, said vertical walls extending outwardly in substantially a horizontal plane to form a resilient flange having a cold-worked structure and a width not greater than about 1¼ inches, said flange having its outer free edge downturned and of a structural contour such that the level of said edge at sections intermediate of adjacent corner sections of said downturned edge is below the level of said adjacent corner sections, said fastening means being selectively positioned beneath the corner sections of said flange and being comprised of bearing plate members having upper and lower opposed flange portions integrally projecting therefrom, demountable brackets adapted for slidable and cooperative bearing registration with said bearing plate flanges, said brackets terminating in outwardly-extending upper and lower flanges, clamping bolts adapted to be received by apertures in said bracket flanges, a projecting member integrally depending downwardly from said brackets, nut members adapted to threadably receive said clamping bolts and disposed above said lower bracket flanges and below said projecting members, said nut members being so positioned as to form a bearing engagement with said projecting members.

10. A sink bowl and sink deck assembly comprising a unitary corrosion-resistant sink bowl unit having a depressed bowl confined by substantially vertical walls outwardly curved in a horizontal plane and extending at their upper marginal edge into a continuous outwardly-extending flange having a cold-worked structure and its outer free edge downturned, said downturned edge having a bowed contour structural confiuration such that the level of the center sections of the outer free downturned edge is below the level of adjacent corner sections thereof, said fastening means being selectively positioned beneath the corner sections of said flange and being comprised of bearing plate members having upper and lower opposed flange portions integrally projecting therefrom, demountable brackets adapted for slidable and cooperative bearing registration with said bearing plate flanges, said brackets terminating in outwardly-extending upper and lower flanges, clamping bolts adapted to be received by apertures in said bracket flanges, a projecting member integrally depending downwardly from said brackets, nut members adapted to threadably receive said clamping bolts and disposed above said lower bracket flanges and below said projecting members, said nut members being so positioned as to form a bearing engagement with said projecting members.

References Cited in the file of this patent

UNITED STATES PATENTS

| | | |
|---|---|---|
| 2,302,292 | Heckathorn | Nov. 24, 1942 |
| 2,503,910 | Kerby | Apr. 11, 1950 |
| 2,534,146 | Rodman | Dec. 12, 1950 |
| 2,539,464 | Norquist | Jan. 30, 1951 |
| 2,582,816 | Bonnell | Jan. 15, 1952 |
| 2,584,860 | Galley | Feb. 5, 1952 |

FOREIGN PATENTS

| | | |
|---|---|---|
| 52,522 | Denmark | Jan. 4, 1937 |